United States Patent
Ko

(10) Patent No.: US 7,301,522 B2
(45) Date of Patent: Nov. 27, 2007

(54) APPARATUS FOR CONTROLLING LCD BACKLIGHT IN MOBILE STATION

(75) Inventor: Moon-Jung Ko, Suwon (KR)

(73) Assignee: Samsung Electronics Co., Ltd. (KR)

( * ) Notice: Subject to any disclaimer, the term of this patent is extended or adjusted under 35 U.S.C. 154(b) by 199 days.

(21) Appl. No.: 10/358,876

(22) Filed: Feb. 5, 2003

(65) Prior Publication Data

US 2004/0041780 A1    Mar. 4, 2004

(30) Foreign Application Priority Data

Aug. 28, 2002  (KR) ............................. 2002-51126

(51) Int. Cl.
  *G09G 3/36*  (2006.01)
(52) U.S. Cl. ................ 345/102; 345/156; 455/574
(58) Field of Classification Search ............ 345/82–84, 345/87–88, 89–102, 211–212, 214, 104; 713/300, 310; 455/574; 315/169.3
See application file for complete search history.

(56) References Cited

U.S. PATENT DOCUMENTS

| | | | | |
|---|---|---|---|---|
| 5,854,617 A | * | 12/1998 | Lee et al. ................... | 345/102 |
| 6,006,335 A | * | 12/1999 | Choi et al. .................. | 713/310 |
| 6,114,814 A | * | 9/2000 | Shannon et al. ............. | 315/219 |
| 6,445,143 B1 | * | 9/2002 | Min ............................ | 315/307 |
| 6,471,651 B1 | * | 10/2002 | Hwang et al. ............... | 600/459 |
| 6,529,182 B1 | * | 3/2003 | Burton ........................ | 345/102 |
| 6,731,958 B1 | * | 5/2004 | Shirai .......................... | 455/574 |
| 6,822,645 B2 | * | 11/2004 | Noritake et al. ............. | 345/211 |
| 2002/0070914 A1 | * | 6/2002 | Bruning et al. .............. | 345/102 |
| 2002/0085371 A1 | * | 7/2002 | Katayama et al. ............ | 362/85 |
| 2003/0040346 A1 | * | 2/2003 | Fukuda et al. ............... | 455/575 |
| 2003/0112216 A1 | * | 6/2003 | Choi ........................... | 345/102 |
| 2003/0214242 A1 | * | 11/2003 | Berg-johansen .......... | 315/169.3 |
| 2004/0001040 A1 | * | 1/2004 | Kardach et al. ............. | 345/102 |

FOREIGN PATENT DOCUMENTS

KR    10-2002-0001070    1/2002

* cited by examiner

*Primary Examiner*—Richard Hjerpe
*Assistant Examiner*—Mansour M. Said
(74) *Attorney, Agent, or Firm*—The Farrell Law Firm

(57) ABSTRACT

There is provided an apparatus for controlling an LCD backlight in a mobile station to perform the operation of the mobile station in a dimming mode more effectively, and extend the maximum allowable operation time of the mobile station, the apparatus including a backlight LED (light emit diode) for generating a backlight to an LCD, a backlight drive for receiving an input current to supply the input current to the backlight LED to drive, a current control unit for controlling the input current of the backlight drive by a current control signal, and a control unit for supplying the current control signal to the current control unit to control the input current of the backlight drive during operation of the LCD according to a normal mode/dimming mode as predetermined.

6 Claims, 3 Drawing Sheets

APPARATUS FOR CONTROLLING LCD BACKLIGHT IN MOBILE STATION

PRIORITY

This application claims priority to an application entitled "APPARATUS FOR CONTROLLING LCD BACKLIGHT IN MOBILE STATION" filed in the Korean Intellectual Property Office on Aug. 28, 2002 and assigned Serial No. 2002-0051126, the contents of which are incorporated herein by reference.

BACKGROUND OF THE INVENTION

1. Field of the Invention

The present invention relates to a mobile station such as a mobile telecommunication station, a personal digital assistant (PDA), etc., provided with a liquid crystal display (LCD) as a display device, and more particularly, to an apparatus for controlling the backlight in a mobile station provided with a color LCD.

2. Discussion of the Related Art

A mobile station, which is in wide use these days, generally includes a plurality of keys for various functions, an LCD, and an LCD backlight for lightening the display of the LCD. While the mobile station is operated and/or the keys are manipulated, the operation according to such manipulation and the data such as input letters, etc., are displayed on the LCD, and further, the information such as date or time, etc., may be also displayed. The battery power provided for the mobile station is supplied to the LCD and the LCD backlight.

In the meantime, in view of the fact that the mobile station uses a chargeable battery as its primary operation power source, efforts have been made to extend the maximum allowable operation time of its battery once the battery is charged. The efforts may be classified into two general categories. First, methods of increasing the charge capacity of the battery, and second methods of reducing the power consumed during the operation of the mobile station. In particular, since a large amount of power is consumed for operating the LCD backlight, a method for reducing the consumed power by properly controlling the backlight of the LCD is being developed.

There are two types of methods typically used as a technology to reduce the electric current for driving the backlight in the conventional mobile station (so called "dimming technology"), which are as follows. One is to forcibly turn off the LCD backlight if there is no input during the operation of the mobile station for a predetermined time, and the other is to turn on/off the output of a backlight drive for driving the backlight by means of an appropriate frequency by using a pulse width modulation (PWM) signal in a control unit of the mobile station.

However, in case of a color LCD, unlike a normal black and white LCD and a gray LCD, a displayed image can be recognized only when light is transmitted through the backlight, and therefore, in the case of using the method of forcibly turning off the backlight in the dimming technology, it has disadvantages that a user cannot see the display, and the user may mistake the absence of the display the mobile station being turned off.

In addition, the method of using the PWM signal requires the generation of the PWM signal in the control unit of the mobile station in the dimming mode, but sometimes the control unit fails to generate the PWM signal, such as during the operation in a sleep mode of the mobile station and therefore, the dimming mode cannot be effectively operated.

SUMMARY OF THE INVENTION

Accordingly, the present invention is directed to an apparatus for controlling an LCD backlight in a mobile station for extending the operation time by reducing the power consumed in the mobile station.

An object of the present invention is to provide an apparatus for controlling an LCD backlight in a dimming mode in a mobile station.

Additional advantages, objects, and features of the invention will be set forth in part in the description which follows and in part will become apparent to those having ordinary skill in the art upon examination of the following. The objectives and other advantages of the invention may be realized and attained by the structure particularly pointed out in the written description and claims thereof as well as the appended drawings.

To achieve these objects and other advantages in accordance with the purpose of the invention, as embodied and broadly described herein, an apparatus for controlling an LCD backlight in a mobile station may include a backlight LED (light emit diode) for generating a backlight to an LCD, a backlight drive for receiving an input current and supplying an output current to the backlight LED to drive the backlight LED, a current control unit for controlling the input current of the backlight drive by a current control signal, and a control unit for supplying the current control signal to the current control unit to control the input current of the backlight drive during the operation of the LCD according to a normal mode/dimming mode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
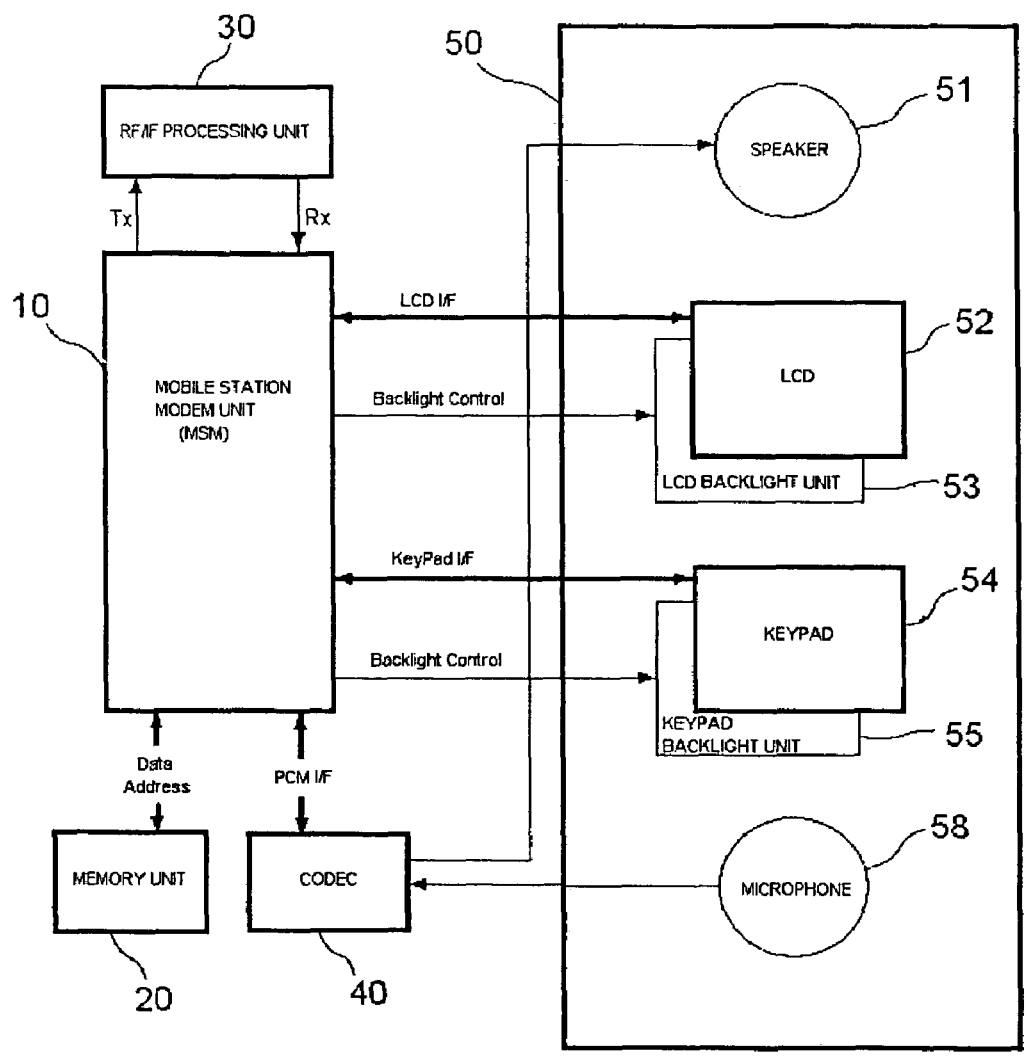
FIG. 1 is a block diagram of a mobile telecommunication station employing an apparatus for controlling an LCD backlight according to an embodiment of the present invention.

FIG. 1 is a block diagram of a mobile station employing an apparatus for controlling an LCD backlight according to an embodiment of the present invention. Referring to FIG. 1, in a mobile telecommunication station where the present invention is employed, a microphone 56 converts a voice of a user in telephone communication into an electrical signal, and sends it to a CODEC 40. A speaker 51, on the contrary, receives the electrical signal for the voice received at the CODEC 40 and generates an audible sound according thereto. The CODEC 40 converts the voice signal received from the microphone 56 into a digital signal (PCM), and sends it to a mobile station modem (MSM) 10 that is a control unit of the mobile telecommunication station. On the contrary, the CODEC 40 can convert the digital signal (PCM) for the voice of a user in the other side from the MSM 10 into an analog signal and sends it to the speaker 51. A memory unit 20 stores operational software of the mobile telecommunication station and various related data. The mobile station modem (MSM) 10 functions as a modem and a CPU to control the entire mobile telecommunication station. The MSM 10 reads the operational software from the memory unit 20 as a CPU, and performs the functions programmed in the software. In addition, the MSM 10 receives user commands and inputs of data from a keypad 54, and sends a current state of the mobile telecommunication station, a user menu, etc., to a liquid crystal display (LCD) 52 for displaying data. In addition, the PCM voice signal received from the CODEC 40 is converted and modulated through channel coding and interleaving, and is sent to an RF/IF processing unit 30. On the contrary, the MSM 10 converts the signal received from the RF/IF processing unit 30 into a PCM voice signal through demodulation, equalization, channel decoding and deinterleaving, and sends the PCM voice signal to the CODEC 40. The RF/IF processing unit 30 converts the modulated signal received from the MSM 10 into an intermediate frequency (IF) signal, again converts the IF signal into a radio frequency (RF) signal, and sends the RF signal to a base station through an antenna. In addition, the RF/IF processing unit 30 receives the RF signal through an antenna from a base station, and converts it into the IF signal, and again converts it into a baseband signal and sends it to the MSM 10. The LCD 52 displays the state information or the user menu, etc. of the mobile telecommunication station received from the MSM 10. The keypad 54 is used to input telephone numbers and data, or input control command for the mobile telecommunication station. An LCD backlight unit 53 provides light to the LCD 52 to enable a user to see the contents displayed on the LCD 52. A keypad backlight unit 55 provides light to the keypad 54 to enable a user to use the keypad 54 in a dark place.

In the mobile telecommunication station having the above structure, the MSM 10 supplies an appropriate control signal (backlight control) to the LCD backlight unit 53 to control the backlight when the mobile station is in a dimming mode according to the characteristics of the present invention, which will be described in detail referring to FIG. 2.

Figure 2:
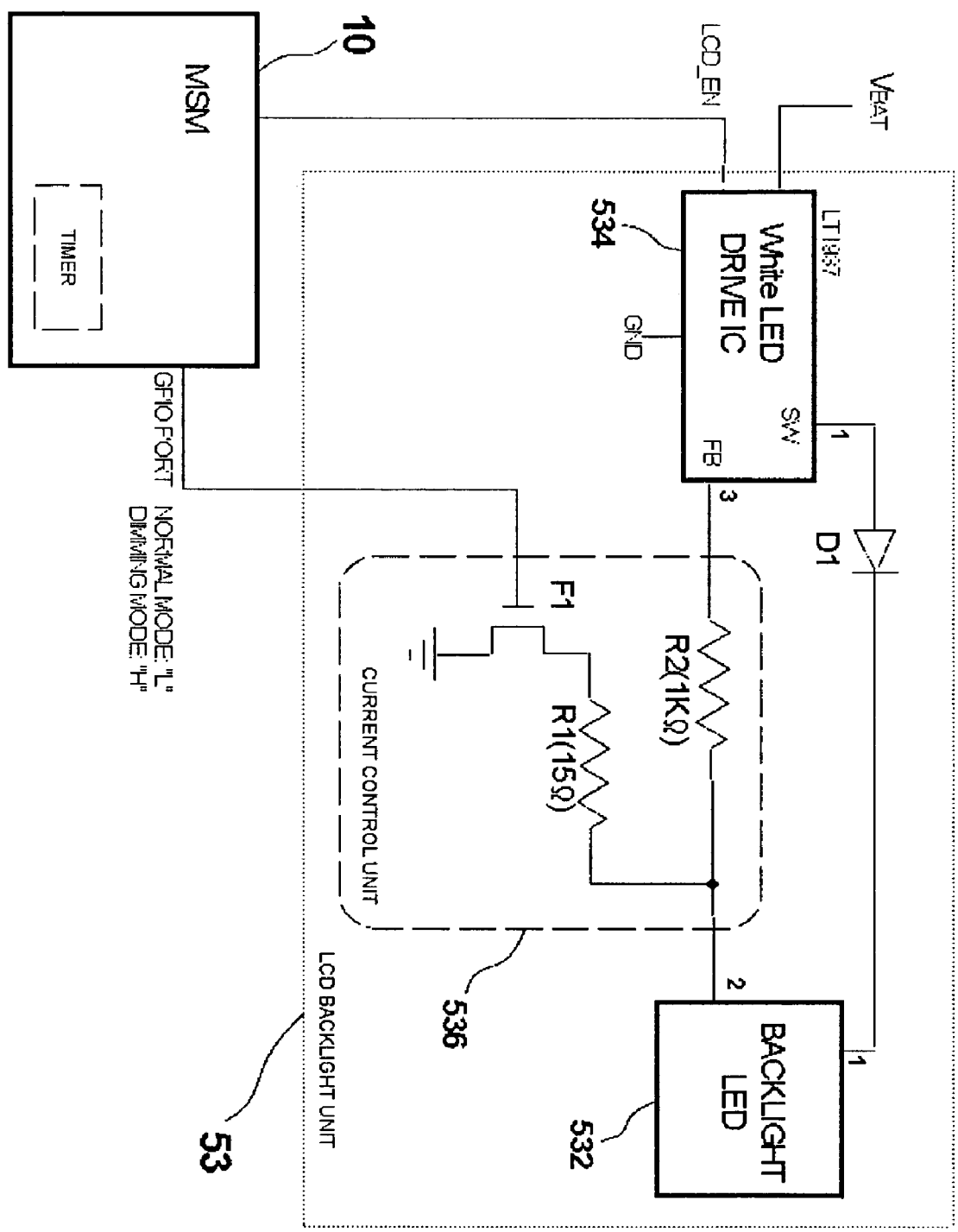
FIG. 2 is a detailed block diagram of an apparatus for controlling the LCD backlight in the mobile telecommunication station of FIG. 1 according to an embodiment of the present invention.

FIG. 2 is a detailed block diagram of the main related units for controlling the backlight in the mobile telecommunication station in FIG. 1 according to an embodiment of the present invention. The LCD backlight unit 53 as shown in FIG. 1 includes a backlight light emitting diode (LED) 532 for generating a backlight to the LCD 52, a backlight drive 534 for supplying an appropriate output signal to the backlight LED 532 to drive the backlight LED 532, and a current control unit 536 for appropriately controlling the current of the input (and the output) signal of the backlight drive 534 by a current control signal.

When LCD 52 is in operation, the MSM 10 supplies an enable signal LCD-EN to the backlight drive 534 of the LCD backlight unit 53 structured as above to drive the backlight drive 534. In addition, the MSM 10 checks if the current operational mode is a normal operational mode or a dimming mode, and outputs a predetermined current control signal in a logic state to current control unit 536. As depicted in the drawings, the control signal supplied from the MSM 10 to the current control unit 536 can be outputted through a general purpose input/output (GPIO) port of the MSM.

By the control signal of the MSM 10, the current control unit 536 is designed to control the input current introduced into the backlight drive 534 according to a normal mode/dimming mode. Referring to the drawings, the current control unit 536 includes a field effect transistor (FET) switch F1 and resistors (R1 [15 Ω], R2 [1 kΩ]) to determine an input current value of the backlight drive 534 by forming an appropriate resistance depending on an on/off state of the FET switch F1, to change an input resistance of the backlight drive 534 according to a current control signal supplied from the MSM 10. In the meantime, in view of FIG. 2, there is provided a path having a diode D1 for supplying a floating current from the backlight drive 534 to the backlight LED 532.

In view of the operation of the LCD backlight unit 53 structured as above in more detail, the MSM 10 outputs a current control signal in a high state to the current control unit 536 through the GPIO port during an initial LCD operation (that is, the operation of a normal mode) according to user's manipulations such as opening the folder of the mobile telecommunication station, etc. and thus, the FET switch F1 becomes an off state. If the FET switch F1 is in off state, there is no current path through a first resistor (dimming resistance) R1 which is connected in parallel to a second resistor R2 connected, in series to the input terminal 3 of the backlight drive 534 and the input terminal of the backlight LED 532. In this case, the current in a normal mode, for example about 8~9 mA of current, flows to the input terminal 3 of the backlight drive 534, and about 23 mA of current flows out. Accordingly, the backlight LED 532 normally maintains a high brightness so that a user can easily recognize the contents displayed on the LCD 52.

In the meantime, if there is no additional input of function keys nor any further manipulations until a predetermined time passes during the operation of the LCD in a normal mode as the above, the MSM 10 confirms this state and is transferred into a dimming mode. In the dimming mode, the MSM 10 outputs a current control signal in a low state to the current control unit 536 through the GPIO port, and thus, the FET switch F1 becomes an on state. If the FET switch F1 is in on state, a parallel connection path is formed between the first resistor (dimming resistance) R1 and the second resistor R2 which is connected in series to the output terminal of the backlight drive 534 and the input terminal of the backlight LED 532. In this case, the current of, for example, about 2 mA in a dimming mode flows in the input terminal 3 of the backlight drive 534, and the current of about 8~9 mA flows out. Accordingly, the brightness of the backlight LED 532 becomes lower than that of a normal mode, but it can maintain an appropriate brightness of a level which is recognizable for a user. Accordingly, the current consumption of the LCD in the dimming mode is reduced much more compared with the normal mode. During the LCD operation according to the dimming mode, if a user performs other manipulations such as pressing a function key, etc., the MSM 10 confirms it and again supplies the current control signal in a high state to the current control unit 536 so that the LCD 52 can be operated in a normal mode. The backlight controlling operation in the normal mode and the dimming mode of the MSM 10 will be described in more detail with reference to the attached drawings.

Figure 3:
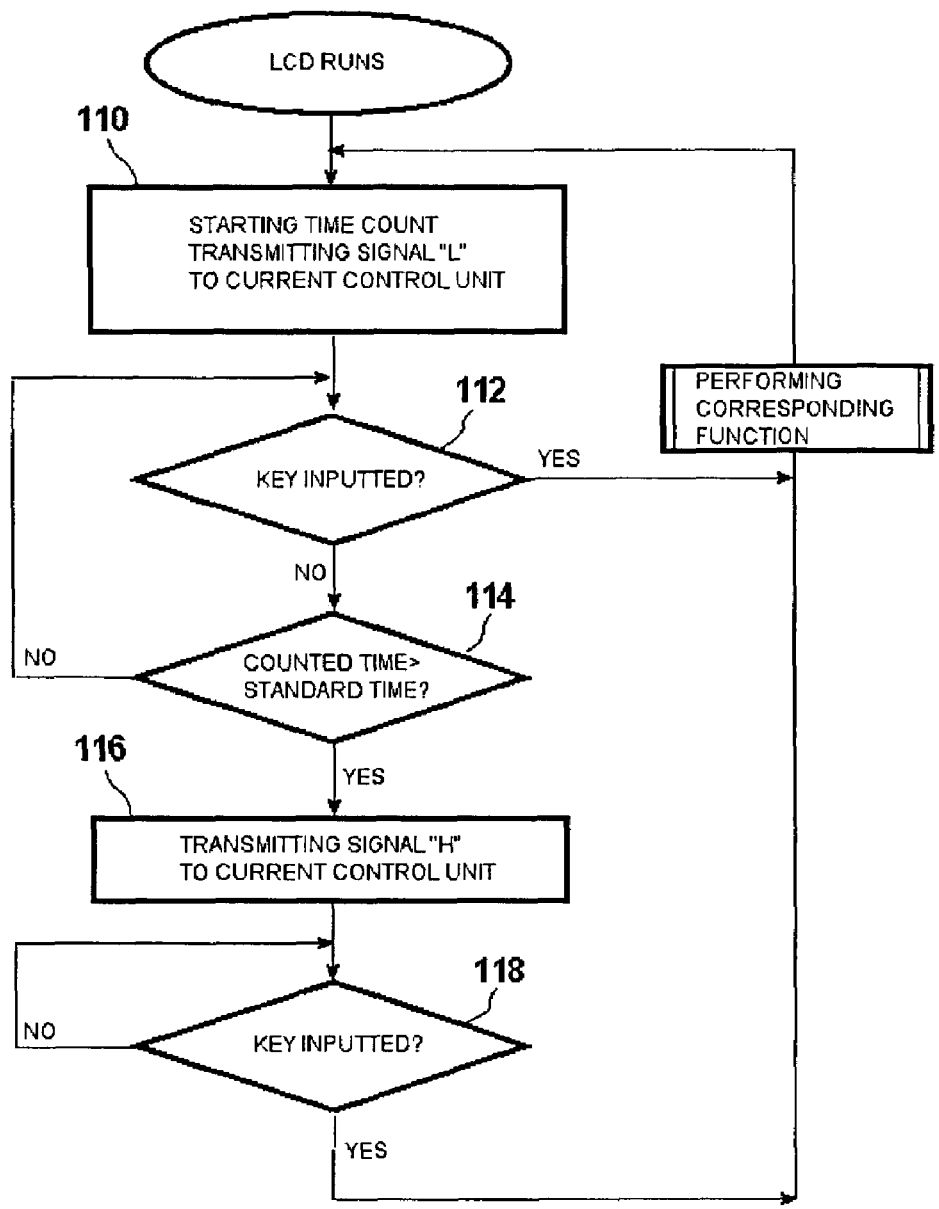
FIG. 3 is an operational flow for the control of the LCD backlight in the mobile station modem of FIG. 2.

FIG. 3 is a flowchart showing the control operation of the backlight in the MSM 10. Referring to FIG. 3, in step 110, with the LCD 53 being driven, the MSM 10 first starts a time count by using an inner timer and outputs a current control signal in a low state to the current control unit 536. In step 112, it is confirmed whether or not a function key is inputted. If a function key has been inputted, the corresponding function of the inputted function key is performed. Then, returning to step 110, the time count is again started and another input of a key is waited. If no key is inputted in step 112, the process proceeds to step 114 and it is checked whether or not the counted time exceeds a predetermined standard time. If the counted time does not exceed the predetermined standard time, the process returns to step 112 and the input of a key is again waited. If the counted time exceeds the predetermined standard time, the process proceeds to step 116.

In step 116, the MSM 10 changes into the dimming mode and outputs a current control signal in a high state to the current control unit 536. Then, the process proceeds to step 118. In step 118, the MSM 10 waits the input of a key. If a key is inputted, the inputted key is confirmed and an operation corresponding to the inputted key is performed. Then, the process returns to step 10 to repeat the above processes.

As described above, the structure and the operation can be made according to one embodiment of the present invention, but the above description is just made to a specific embodiment of the present invention, but the various modifications can be made without departure of the spirit of the present invention.

In addition, although the above description is made about the LCD backlight control device of the mobile station that is applied to the mobile telecommunication apparatus, the present invention can be applied to any kind of mobile stations which use an LCD and a battery such as personal digital assistant (PDA).

As described above, compared with the prior art, the LCD backlight apparatus of the present invention can perform the dimming mode more effectively and reduce the current consumption, so that the maximum allowable operation time is increased.

It will be apparent to those skilled in the art that various modifications and variations can be made in the present invention. Thus, it is intended that the present invention covers the modifications and variations of this invention provided they come within the scope of the appended claims and their equivalents. Therefore, the scope of the present invention is not limited to the described embodiments, and should be determined by the claims and their equivalents.

What is claimed is:

1. An apparatus for controlling a backlight of an LCD in a mobile station comprising:

a backlight LED (Light Emit Diode) for generating a backlight to the LCD;

a backlight drive which receives an input current and supplies an output current to the backlight LED to drive the backlight LED;

a current control unit for controlling the input current of the backlight drive by a current control signal; and a control unit for supplying the current control signal to the current control unit to control the input current of the backlight drive according to the normal mode or dimming mode, as determined depending on whether there is a user's key manipulation, during operation of the LCD, wherein when in the dimming mode the input current of the backlight drive is less than the input current during the normal mode and greater than 0.

2. The apparatus of claim 1, wherein the current control unit comprises a switch which is switched on or off according to the current control signal, and resistors for forming an input current value of the backlight drive by varying resistance depending on the on and off state of the switch.

3. The apparatus of claim 1, wherein in the normal mode is set during the initial operation of the LCD, the dimming mode is entered into if there is no key input during a predetermined time during the normal mode, and the normal mode is reset if there is a key input during the dimming mode.

4. The apparatus of claim 2, wherein in the normal mode is set during the initial operation of the LCD, the dimming mode is entered into if there is no key input during a predetermined time during the normal mode, and the normal mode is reset if there is a key input during the dimming mode.

5. An apparatus for controlling a backlight in a mobile station including a backlight drive which receives an input current, and supplies an output current to a backlight LED to drive the backlight LED, comprising:

a current control unit including a switch which is switched on and off according to a current control signal, and resistors for forming an input current value of the backlight drive by varying the resistance depending on the on and off state of the switch; and a control unit for supplying the current control signal to the current control unit to control the input current of the backlight drive during the operation of the LCD according to a normal mode or dimming mode, wherein when in the dimming mode the input current of the backlight drive is less than the input current during the normal mode and greater than 0.

6. The apparatus of claim 5, wherein the normal mode is set during the initial operation of the LCD, the dimming mode is entered into if there is no key input during a predetermined time during the normal mode, and the normal mode is reset if there is a key input during the dimming mode.

* * * * *